United States Patent
Chiarella et al.

(10) Patent No.: US 10,831,513 B2
(45) Date of Patent: Nov. 10, 2020

(54) CONTROL TRANSPARENCY OF A TOP LAYER PROVIDED BY AN ADDITIONAL TRANSPARENT LAYER ON TOP OF THE TOP LAYER BASED ON RELEVANCE

(71) Applicant: INTERNATIONAL BUSINESS MACHINES CORPORATION, Armonk, NY (US)

(72) Inventors: Giacomo G. Chiarella, Eastleigh (GB); Hisham Jafar Ali, Nottingham (GB); Matthew J. Kempa, Congleton (GB); Syed Akhass Adnan Wasti, Cambridge (GB)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 15/804,157

(22) Filed: Nov. 6, 2017

(65) Prior Publication Data
US 2019/0138323 A1    May 9, 2019

(51) Int. Cl.
*G06F 9/451*    (2018.01)
*G06F 9/54*    (2006.01)
(Continued)

(52) U.S. Cl.
CPC .......... *G06F 9/451* (2018.02); *G06F 3/0482* (2013.01); *G06F 3/04886* (2013.01);
(Continued)

(58) Field of Classification Search
CPC ................. G06F 9/451; G06F 2203/04804
(Continued)

(56) References Cited

U.S. PATENT DOCUMENTS 8,913,014 B2 * 12/2014 Naganawa ............ G06F 3/0488
                                                                    178/18.01
9,703,841 B1   7/2017 Hwang et al.
(Continued)

FOREIGN PATENT DOCUMENTS

EP        2813933 A1    12/2014

OTHER PUBLICATIONS

Anonymous, "Method for Selecting Functions in a Multiple Layer Screen Display for Smartphone," An IP.com Prior Art Database Technical Disclosure, May 30, 2013, p. 1, IP.com No. IPCOM000227970D.
(Continued)

*Primary Examiner* — Abdullah Al Kawsar
*Assistant Examiner* — Kenny Nguyen
(74) *Attorney, Agent, or Firm* — Robert C. Bunker

(57) ABSTRACT

A method, system, and program product are provided for controlling layers in a graphical user interface. The method includes an operating system function of a mobile computing device running a current application with a current layer of user interaction via the graphical user interface, detecting an event providing a top layer display, determining if the top layer display has sufficient relevance to the user to interrupt the current application. If the top layer display does not have sufficient relevance, the method makes the top layer display control transparent so that the user continues to interact with the current application in the graphical user interface while maintaining the top layer in visual order. When the top layer is control transparent, the method may provide a visual cue of control transparency to the user.

11 Claims, 7 Drawing Sheets

(51) Int. Cl.
 G06F 3/0482 (2013.01)
 G06F 3/0488 (2013.01)
 H04L 12/58 (2006.01)
 G06F 3/0481 (2013.01)
(52) U.S. Cl.
 CPC ............ *G06F 9/542* (2013.01); *G06F 3/0481* (2013.01); *G06F 2203/04803* (2013.01); *G06F 2203/04804* (2013.01); *H04L 51/32* (2013.01)
(58) Field of Classification Search
 USPC .......................... 715/766, 790, 794, 808, 802
 See application file for complete search history.

(56) References Cited

U.S. PATENT DOCUMENTS

| | | | |
|---|---|---|---|
| 9,720,557 B2 | 8/2017 | Steinbach et al. | |
| 10,444,930 B2* | 10/2019 | Kim | G02B 27/0179 |
| 2011/0004843 A1* | 1/2011 | Yamada | G06F 3/0483 |
| | | | 715/790 |
| 2011/0004845 A1* | 1/2011 | Ciabarra | G06F 3/0481 |
| | | | 715/808 |
| 2011/0107212 A1* | 5/2011 | Jeong | G06F 3/0488 |
| | | | 715/702 |
| 2011/0283226 A1* | 11/2011 | Basson | G06F 9/453 |
| | | | 715/794 |
| 2012/0258691 A1* | 10/2012 | Baer | G06F 3/0481 |
| | | | 455/412.2 |
| 2013/0104065 A1 | 4/2013 | Stecher | |
| 2014/0033117 A1 | 1/2014 | Kim et al. | |
| 2014/0043431 A1* | 2/2014 | Kato | H04N 7/147 |
| | | | 348/14.12 |
| 2015/0227195 A1* | 8/2015 | McKenna | G06F 3/0481 |
| | | | 345/156 |
| 2017/0075539 A1* | 3/2017 | Borromeo | G06F 3/04842 |
| 2017/0192620 A1* | 7/2017 | Kim | G06F 3/011 |
| 2018/0077097 A1* | 3/2018 | Alfaro | H04L 51/16 |
| 2018/0091669 A1* | 3/2018 | Michimura | H04N 1/00411 |
| 2018/0181263 A1* | 6/2018 | Mathias | G06F 3/0482 |
| 2019/0253378 A1* | 8/2019 | Gu | H04M 1/72547 |

OTHER PUBLICATIONS

Anonymous, "Intercept User Input to Avoid Unintended Clicks or Route to Intended Elements," An IP.com Prior Art Database Technical Disclosure, Dec. 24, 2016, p. 1-2, IP.com No. IPCOM000248676D.
Hewiki, "GUI Layers," HeroEngine Wiki, Last Modified on Nov. 10, 2011, p. 1-5, hltp://hewiki.heroengine.com/wiki/GUI_Layers, Accessed on Oct. 27, 2017.

* cited by examiner

CONTROL TRANSPARENCY OF A TOP LAYER PROVIDED BY AN ADDITIONAL TRANSPARENT LAYER ON TOP OF THE TOP LAYER BASED ON RELEVANCE

BACKGROUND

The present invention relates to graphical user interfaces, and more specifically, to control of layers in a graphical user interface.

A computing device such as a smart phone or tablet with a touchscreen user interface or a computer system with a non-touchscreen user interface may have multiple layers or windows on the graphical user interface (GUI) that the user may interact with. It is often not possible for the user to access different layers of the GUI due to the top layer taking preference. For example, a top layer may be a pop-up box with an event notification, or an instant messaging chat window, etc.

In one example, an instant messaging chat may be provided as a layer over an open application on a GUI. The user may not be able to access the application behind the area of the instant messaging chat without removing or closing the instant messaging chat. Furthermore, if an event is triggered in the instant messaging chat that creates another layer over the top of the chat, the user may no longer access the chat as a result of its priority.

Additionally, if a user is typing or interacting with an application and a chat appears as a layer on top of the application, the user may interact with the chat by mistake because that layer has preference over the application in which the user was typing leading to errors and frustration by the user.

The user may be forced to interact with a top layer in the area where the top layer obscures the layer below before interacting with the layer below. In some cases the pop-up event notifications do not need an action, but the user must wait for the event notification to end in order to continue interacting with an application on a layer below.

SUMMARY

According to an aspect of the present invention there is provided a computer-implemented method for control of layers in a graphical user interface, comprising: running a current application with a current layer of user interaction via the graphical user interface; detecting an event providing a top layer display; determining if the top layer display has sufficient relevance to the user to interrupt the current application; if the top layer display does not have sufficient relevance, making the top layer display control transparent so that the user continues to interact with the current application in the graphical user interface while maintaining the top layer in visual order; and wherein, when the top layer is control transparent, providing a visual cue of control transparency to the user.

According to a further aspect of the present invention there is provided a system for control of layers in a graphical user interface, comprising: a processor and a memory configured to provide computer program instructions to the processor to execute the function of the following components; a current application component for running a current application with a current layer of user interaction via the graphical user interface; an event display detecting component for detecting an event providing a top layer display; a relevance component for determining if the top layer display has sufficient relevance to the user to interrupt the current application; and a top layer control component for making the top layer display control transparent if the top layer display does not have sufficient relevance, so that the user continues to interact with the current application in the graphical user interface while maintaining the top layer in visual order; wherein, when the top layer is control transparent, providing a visual cue of control transparency to the user.

According to a further aspect of the present invention there is provided a computer program product for control of layers in a graphical user interface, the computer program product comprising a computer readable storage medium having program instructions embodied therewith, the program instructions executable by a processor to cause the processor to: run a current application with a current layer of user interaction via the graphical user interface; detect an event providing a top layer display; determine if the top layer display has sufficient relevance to the user to interrupt the current application; and, if the top layer display does not have sufficient relevance, make the top layer display control transparent so that the user continues to interact with the current application in the graphical user interface while maintaining the top layer in visual order; and wherein, when the top layer is control transparent, provide a visual cue of control transparency to the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

A computing device may have a graphical user interface having multiple layers of a graphical user interface (GUI) for simultaneously interacting with multiple applications and the operating system. The computing device may be a mobile computing device in the form of, for example, a smartphone, a tablet computer, a personal digital assistant, a smart watch, or another form of device having a touchscreen graphical user interface. The computing device may alternatively be a laptop or desktop computer or other computing device having a non-touchscreen graphical user interface.

The graphical user interface may receive user inputs via a pointer device such as a mouse or keypad, or via touch in the case of a touchscreen. A touchscreen user interface is an input and output device provided with an electronic visual display of a computing device. The user can use the touchscreen to react to what is displayed by making inputs or control the computing device through simple or multi-touch gestures by touching the screen with a special stylus or one or more fingers.

When interacting with a device, the user may interact with different layers of the GUI. GUI layers or windows are used as a means to separate out various related interface elements to their own groups, for example, as belonging to a specific application. The layers may be thought of as transparent superimposed slides providing GUI controls for a particular group. The use of layers enables entire groups of controls to be turned on or off simultaneously thereby controlling which interface elements the user may interact with.

Figure 1:
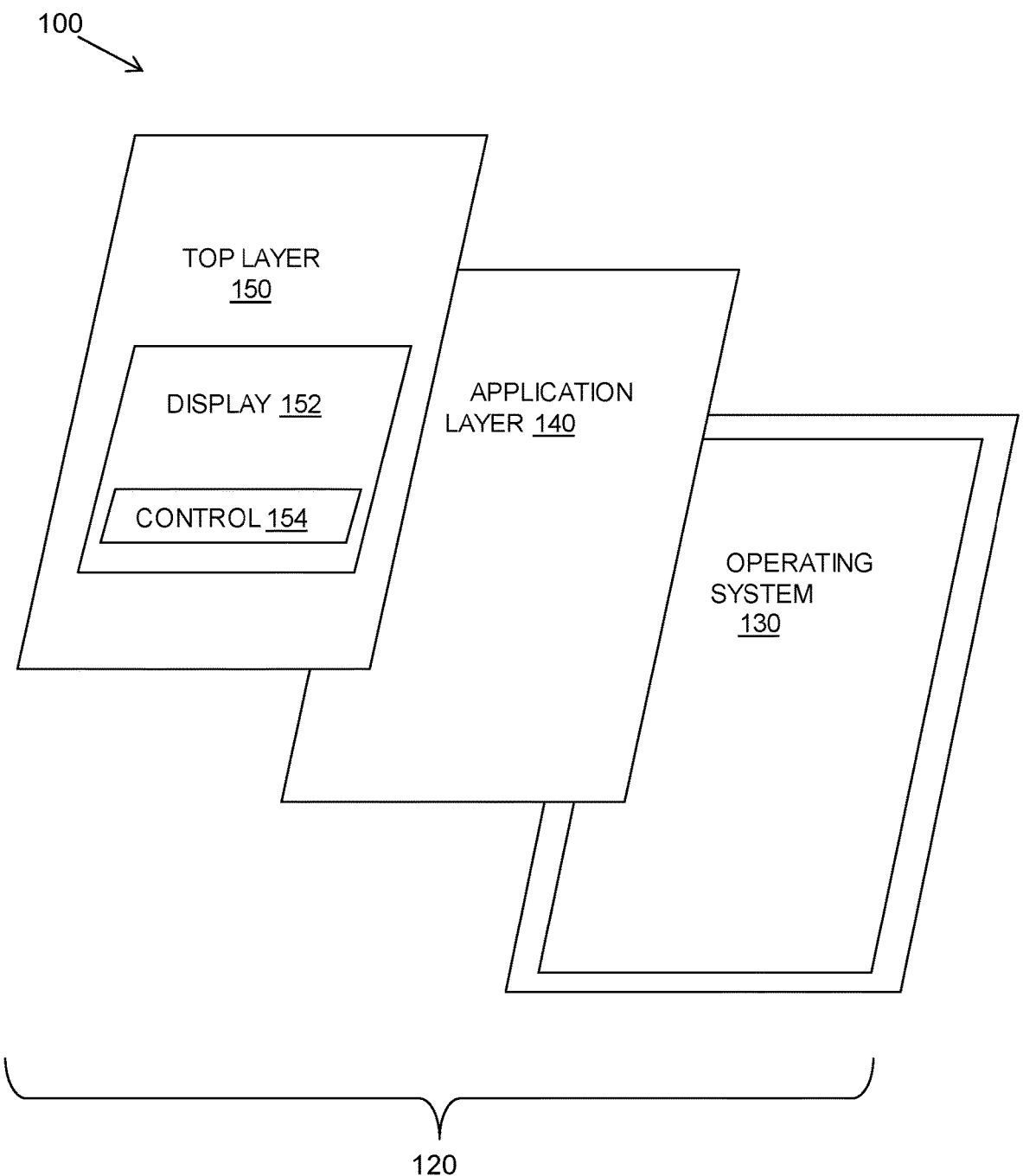
FIG. 1 is a schematic diagram of a mobile device having layers in a graphical user interface.

Referring to FIG. 1, an exploded schematic diagram 100 shows an example embodiment of a mobile computing device 100 with a graphical user interface 120 in the form of a touchscreen user interface. The touchscreen user interface 120 may include layers such as an operating system user interface layer 130 and application user interface layers 140. Each application may user multiple layers if it requires superimposed displays for the application content.

A top user interface layer 150 may be provided that may be an application user interface layer 140 or a layer used by the operating system for alerts, or other forms of prioritized content. The top user interface layer 150 may be used to display 152 information, such as a pop-up notification or alert, and may include one or more control elements 154 for interacting with the display 152.

The top user interface layer 150 may display 152 information provided by a variety of user interface implementations. The top layer display 152 may be controlled by the operating system or middleware in an application operating on the operating system. Top layer displays 152, whatever form they take, have the common property that they require interaction to action them, remove them, or the elapse of a predefined time period before they are no longer displayed on top of a current application and the user can revert to their activity on a current application.

Top layer displays 152 may be due to an always-on-top layer for displaying prioritized content; the prioritized content may be from applications other than the application currently being used and displayed on the user interface. The top layer displays 152 may be alerts from the operating system or from applications that have settings in the operating system enabling alerts to be displayed. The top layer displays 152 may be modal windows of the application currently being used and displayed on the user interface to notify the user of information that is relevant to the application.

The order of layers of a user interface 120 may be described by a depth or z-order in the z-axis of the display plane and a layer class priority may be provided in the operating system and applications for prioritizing touch handling of the user interface layers. Displays of applications currently executing on a mobile device may be rendered in a depth or z-order based on priority determined between the applications.

In one embodiment, multiple layers of the graphical user interface may be provided and may be hardcoded into a GUI layers script. Controls may be placed on a layer by setting a layer field in Extensible Markup Language (XML).

The described method and system determine the relevance of a top layer display to the user and make the top layer control transparent if it is not relevant so that the user may continue to interact with a current application on a lower layer without being interrupted. The user may be made aware of the top layer display, however the control transparency may enable the user to revert to the notification when they are ready. This gives more control to the user with regards to layers, by allowing them to access and control different layers and optimizing when they access these layers.

The layer of the GUI that the user interacts with on the UI is determined based on a relevance of a layer in a given situation. The relevance determination may be made based on past interaction of the user with the given type of top layer notification.

Figure 2:
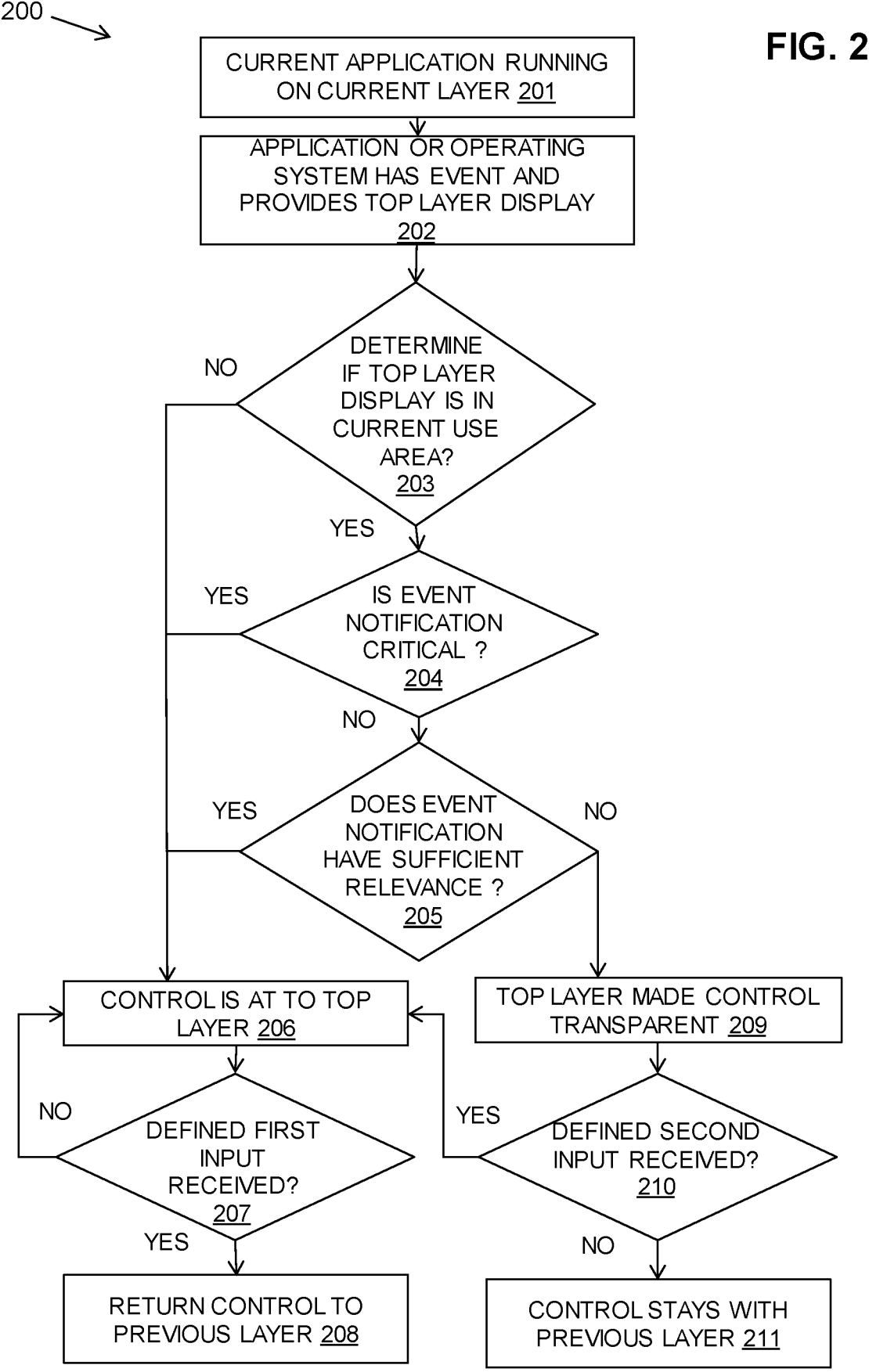
FIG. 2 is a flow diagram of an example embodiment of a method in accordance with the present invention.

Referring to FIG. 2, a flow diagram 200 illustrates an example embodiment of an aspect of the described method as carried out by an operating system functionality of a computing device.

A current application may be running 201 in a current layer being interacted with by a user of the computing device. An event may occur 202 in an application or the operating system and the application or operating system may provide a top layer display providing information on top of the current user interface layer of the current application.

The application may be a background application running simultaneously with the current application or may be the current application itself. For example, a background application may be an instant messaging application and an event may be the receipt of an incoming message. In another example, the current application may generate events that create modal windows. In a further example, the operating system may generate alerts or notifications relating to its functionality or that of other applications.

The method may determine 203 if the top layer display is in the same area of the screen as currently being used by the user for the interaction with the current application. The method may identify where the user is interacting with the current layer and compare this to where the new top layer display is to be displayed that may potentially block the interaction. For example, an area bounding coordinates where the user has interacted with the graphical in a predefined time period may be compared to the coordinates of the event display in the top layer. If these coordinates overlap, then the top layer display is likely to interfere with the user's current interaction. Alternatively, the method may skip this step and consider any top layer display to be an interruption to the user.

If the top layer display is not in the same area, the method may enable the event display in the top layer with control passed 206 to the top layer of the user interface. This may be implemented as a usual top layer display would be activated.

Whilst control is at the top layer, it may be determined 207 if a defined first graphical user interface input or gesture in the case of a touchscreen is received to dismiss the top layer display and to return 208 controls to the previous current layer of the current application.

The method may determine 204 if the event display is critical. The determination may be based on predefined rules for critical notifications. Critical notifications may be operating system event notifications that affect the operation of the computing device. The predefined rules may be configured by a user to enable event displays from predefined applications or relating to predefined events of certain applications. As an example, a user may configure a rule to allow event displays in the form of an instant messaging chat from a particular person. This may be configured for a certain period of time.

If an event display is determined 204 to be critical, the method may enable the event display in the top layer with control passed 206 to the top layer of the user interface. This may be implemented as a usual top layer display would be activated.

Whilst control is at the top layer, it may be determined 207 if a defined first graphical user interface input is received to dismiss the top layer display and to return 208 controls to the previous current layer of the current application.

If an event display is determined 204 to not be critical, the method may determine 205 if the event display has sufficient relevance to the user for the user to be interrupted from their current activity. The relevance determination may be based on whether the event display has any actionable control items in it and based on learning from past interaction of the user with this type of event display. Further details of the relevance determination are provided with reference to FIG. 3.

If it is determined 205 that the event display has sufficient relevance to interrupt the user, then control is passed 206 to the top layer display. As before, whilst control is at the top layer, it may be determined 207 if a defined first graphical user interface input is received to dismiss the top layer display and to return 208 controls to the previous current layer of the current application.

If it is determined 205 that the event display does not have sufficient relevance to interrupt the user, the event display may be displayed but in a control transparent form 209. Therefore, the graphical user interface control remains with the current application.

The control transparency may be achieved by various methods and systems as described with reference to FIGS. 4A and 4B. In these methods and systems, the top layer control elements are made ineffective by being deactivated, overridden by other controls, or by having their priority changed. This enables the control elements of the current application layer to continue to function.

The event display may be made partially transparent to enable the user to see the control elements of the current application layer. If the event display is fully displayed and not partially transparent, the user may continue interacting with the current application layer by remembering what was behind the top layer event display. For example, a top layer event display may fully or partially cover the keyboard controls of the current application layer in a touchscreen user interface, however a user may continue to type, as they know the order of the keys in the keyboard.

It may be determined 210 if a defined second graphical user interface input or gesture in the case of a touchscreen is received to activate the top layer display to enable control of the event display. For example, in a touchscreen user interface, the user may press and hold the layer on top, which does not have any control, to tell the operating system that the user wants to control that layer. Alternatively, if the operating system detects that the user has not interacted with the current application for a predefined period of time, it may default all controls to the top layer.

If such as user interface input or gesture is received, the method may pass 206 control to the top layer. If such a user input or gesture is not received, the control may stay 211 with the current layer of the current application.

In this way, operating system level function decides layer control for the user based on determined relevance of an event display.

If a top layer is control transparent, it may remain displayed until an input or gesture is received 210 or a timer may be provided after which the event display may be converted to a display symbol or other non-top layer notification.

Figure 3:
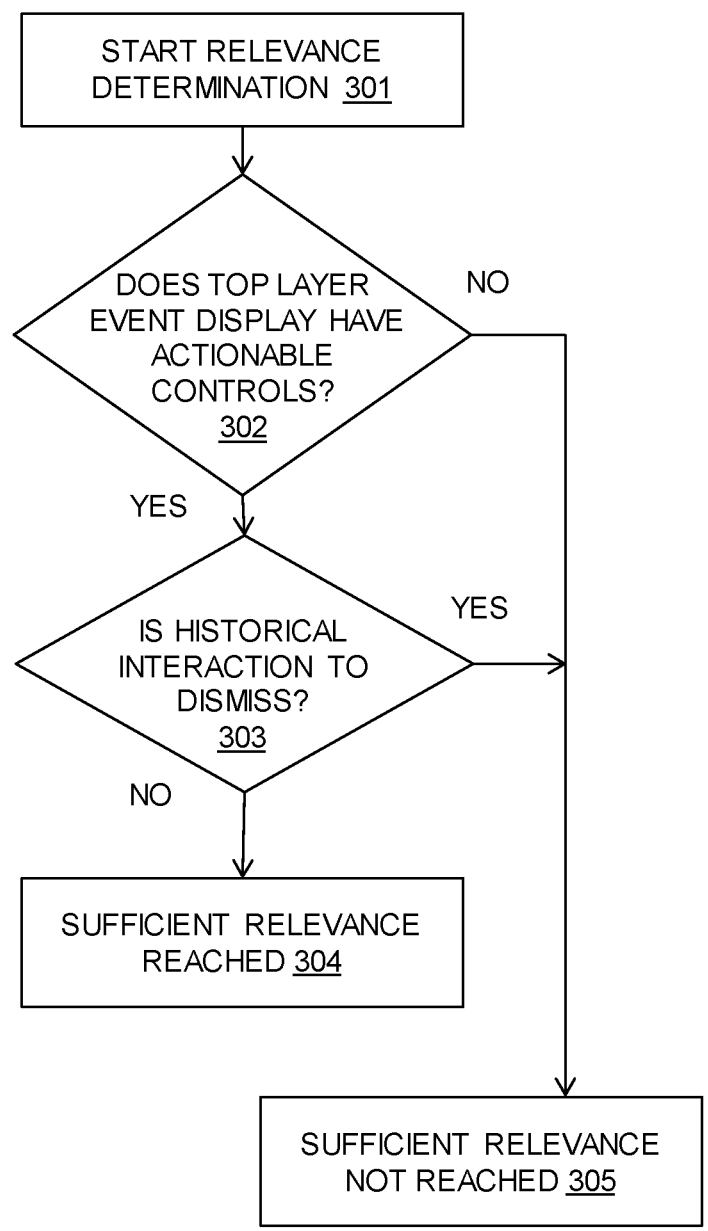
FIG. 3 is a flow diagram of an example embodiment of a further aspect of a method in accordance with the present invention.

Referring to FIG. 3, a flow diagram 300 illustrates an example embodiment of an aspect of the described method as carried out by an operating system functionality of a computing device for determining relevance of an event display as required at step 205 of FIG. 2.

The method may start 301 a relevance determination. As an optional consideration, it may be determined 302 if the lop layer event display has any actionable controls. This may be determined by detecting control elements in a top layer display. If there are no actionable controls, then sufficient relevance is not reached 305. In this case, the method may continue as described in FIG. 2 with the top layer display being partially transparent. This may ensure that the event display is seen but that it does not interfere with the current application.

It may be determined 303 if historical interaction of the user with this type of event display is to dismiss it. The historical interaction may be a score determined by past user interactions with this type of event display. For example, it could be determined by how many times the user has interacted with the event display when it has appeared as a top layer, as opposed to dismissing it immediately before performing any actions. It may also depend on how long it takes for a user to dismiss an event display after it appears. Dismissal refers to removing a layer from the screen or closing an application after it pops up, though input or gesture control. Interaction refers to using buttons on the screen, and opening notifications.

A log may be maintained of historical user interactions with event displays on a top layer, which may be used to set the relevance determination. The log may categorize event display types, for example, by application. The log may be continually updated enabling the relevance determination to be improved during ongoing learning from the user's reactions to event displays.

If it is determined 303 that the historical interaction is to dismiss the event display, then sufficient relevance is not reached 305. However, if it is determined 303 that the historical interaction is not to dismiss the event display but instead to interact with it, then sufficient relevance is reached 304. This determination outcome is used in step 205 of the method of FIG. 2.

In this way, an algorithm decides if an event display layer is actionable, and if the layer is not actionable or the user never actions upon it, the controls of the computing device remain on the current layer that was already being operated on. Furthermore, if the layer is actionable, then the user will be able to access the previous layer through gesture control as described in relation to FIG. 2.

In one example embodiment, a user may have a mobile phone running an application and there is a messenger application in the background that is not open or displaying on the screen.

The user receives a message. The messaging application attempts to notify the user about this message by creating a new layer on top of the layer the user is currently acting on. One example is a chat head that allows a user to read and reply to instant messages while using another application.

The described method determines whether it the new layer is actionable by checking if there is anything the user can interact with on the layer, such as buttons.

The described method may also have recorded how the user interacts with this type of new layer in the past, to determine the relevance to the user. For example, if a user never interacts with a messenger new layer and always dismisses it, the method will assign no relevance to it.

If the new layer is more important or relevant than the current layer, the control of the screen moves to the new layer. The previous layer may now be accessed using gesture control, for example, two fingers instead of one finger gesture.

If the previous layer is more important or relevant or the top layer has nothing actionable, the top layer is disabled and control remains on the current layer being used prior to the event.

To ensure that pop-ups that are critical to the operation of an application are not dismissed through this method, a locking state may be imposed for critical layers ensuring these are not dismissed and meaning that the user cannot access previous layers during the popping of critical layers.

Figure 4A:
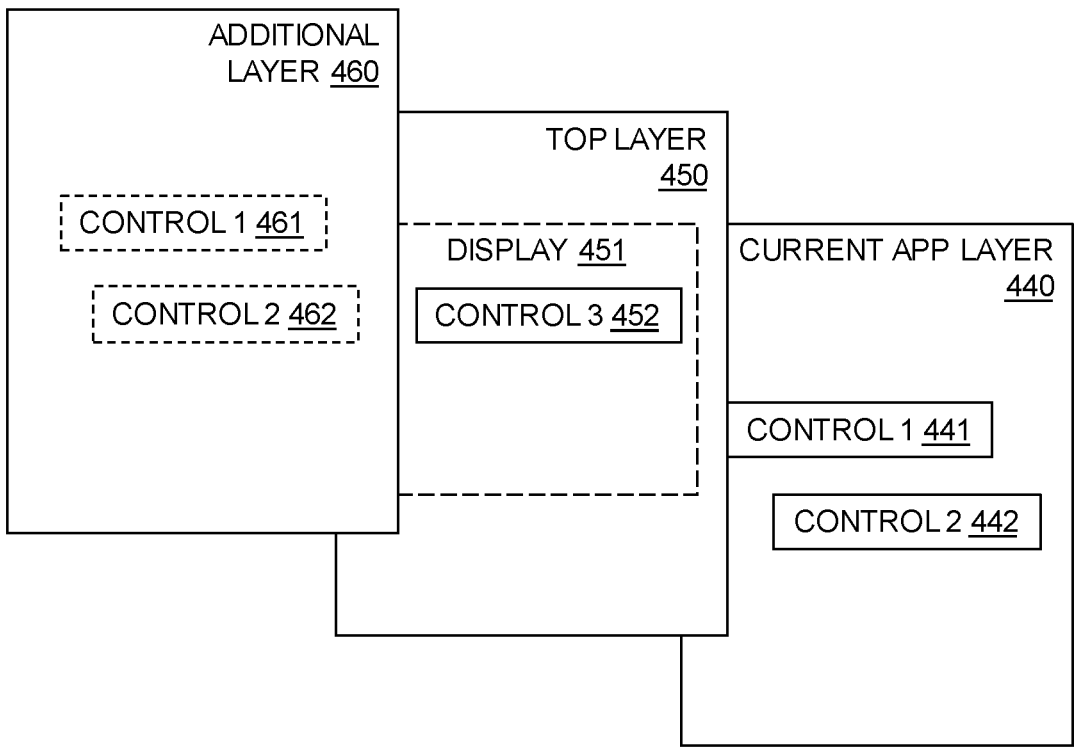
FIGS. 4A and 4B are schematic diagrams illustrating example embodiments of an aspect of the present invention.
Figure 4B:
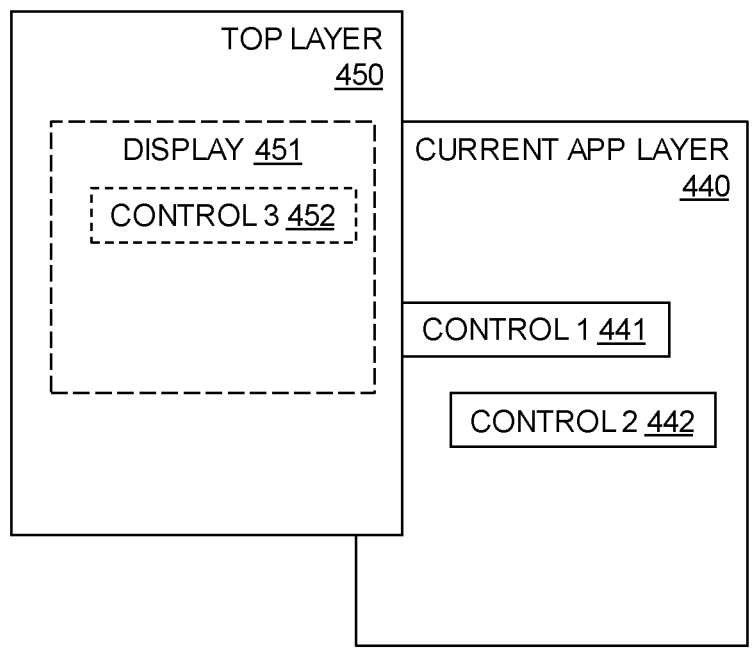

Referring to FIGS. 4A and 4B, schematic diagrams 400, 410 are used to describe example implementation of control transparency of a top layer. These implementations may be applied to a computing device having a touchscreen. Equivalent implementations may be applied to a computing device with a non-touchscreen user interface, for example, using a window manager.

A current application layer 440 is provided with example controls 441, 442 at locations on a touchscreen display. A top layer 450 is generated with a display 451 on top of the current application layer 440. The top layer display 451 has an example control 452.

A first embodiment of control transparency is described with reference to FIG. 4A, in which an additional layer 460 that is completely visually transparent is provided on top of the top layer 450 when control transparency of the top layer 450 is required. The additional layer 460 relays all user inputs to the current application layer 440. The additional layer 460 has nothing displayed but has touch control that relays the touch inputs such as those in the control areas 461, 462 corresponding to the controls 441, 442 back to the current application layer 440 overriding any controls 352 in the top layer 450.

A second embodiment of control transparency is described with reference to FIG. 4B, in which all inputs to the top layer 450 are relayed to the current application layer 440 at exactly the same location on the screen where the controls were mapped. Any controls 452 in the top layer 450 are disabled as shown by the dashed outline of the control 452. Touchscreens have an (x,y) coordinate for when the user input is received and this can be inputted to the current application layer 440 behind the top layer 450.

A third embodiment of control transparency may be implemented by changing the operating system's understanding of the order of the layers. Normally, the operating system may equate the visual order of the layers to the control order of the layers. However, these two parameters may be separated changing the order of controls. For example: there may be order 1 2 3 in terms of visual layers, and order 1 3 2 in terms of control layers.

The display 451 of the top layer 450 may be made partially transparent as shown by the dashed outline in FIG. 4A and FIG. 4B enabling the user to see the controls 441, 442 of the current application layer 440 through the display 451.

Alternatively, the display 451 may be fully displayed and may cover the display of the controls 441, 442 in the current application layer 440. The user may continue to interact with the current application layer 440 with the hidden controls 441, 442 as the controls will be active due to transparency of controls in the top layer 450.

The described method focuses on user input and rather than hiding displays, allows them to co-exist but with control transparency so that the user can continue to interact with the previous layer. The method keeps user input at the last most contextually relevant layer in a stack of the device.

The advantage of the described method lies in changing the layer the user controls depending on the relative relevance of a layer in a given situation, and making layers control transparent so that users can control the layers beneath.

Figure 5A:
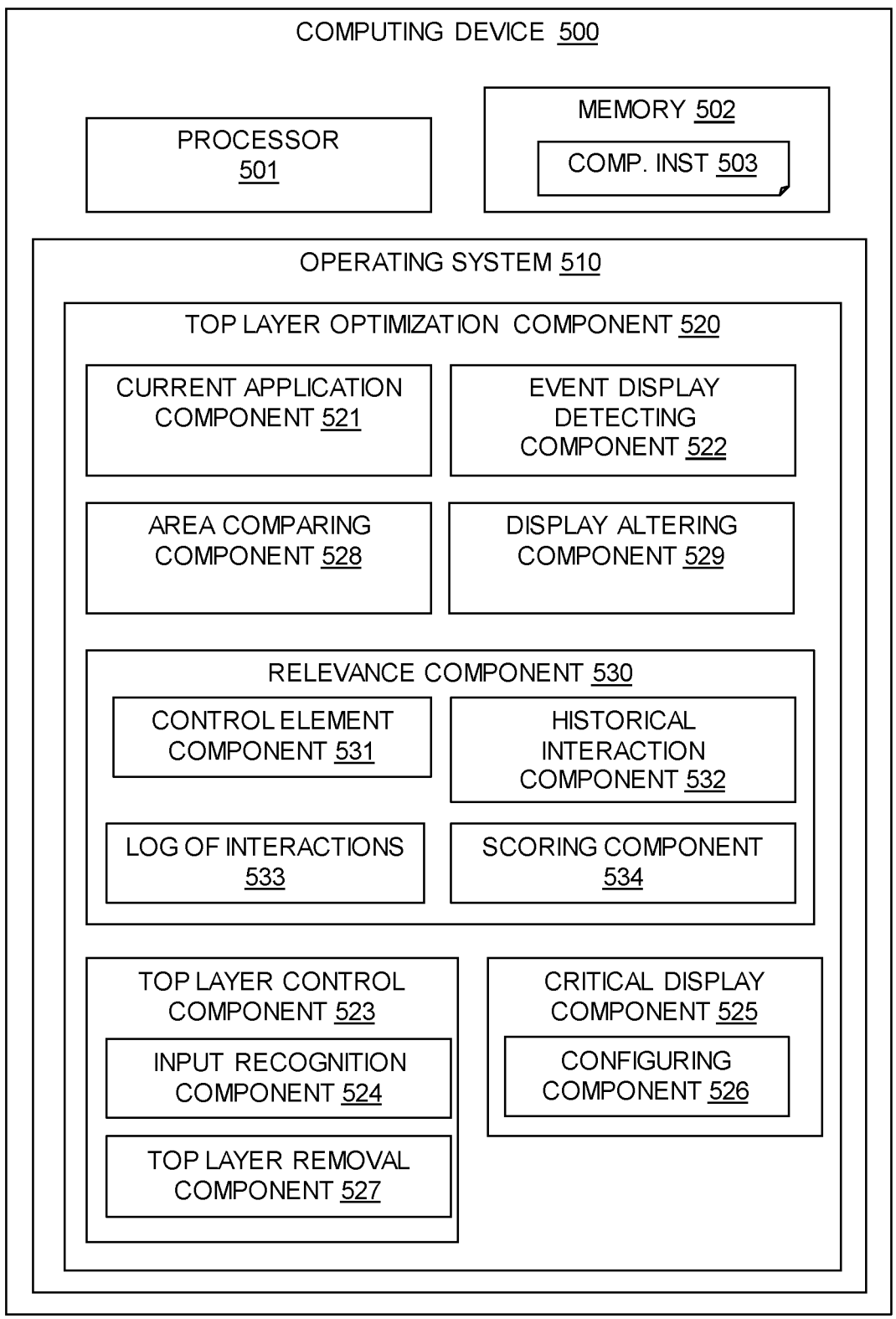
FIGS. 5A and 5B are block diagrams of example embodiments of a system in accordance with the present invention.

Referring to FIG. 5A, a top layer optimization component 520 is described as a functional modification to an operating system 510 of a computing device 500.

The computing device 500 may include at least one processor 501, a hardware module, or a circuit for executing the functions of the described components which may be software units executing on the at least one processor. Memory 502 may be configured to provide computer instructions 503 to the at least one processor 501 to carry out the functionality of the components.

The top layer optimization component 520 may include a current application component 521 for running a current application with a current layer of user interaction via the graphical user interface. The top layer optimization component 520 may include an event display detecting component 522 for detecting an event providing a top layer display. An event may be an event from the current application, another application, or the operating system.

The top layer optimization component 520 may include an area comparing component 528 for determining if the event display corresponds to a user's current area of interaction with the user interface.

The top layer optimization component 520 may include a relevance component 530 for determining if the top layer display has sufficient relevance to the user to interrupt the current application.

The relevance component 530 may include a control element component 531 for determining if the top layer display has any actionable control elements.

The relevance component 530 may include a historical interaction component 532 for measuring the relevance based on historical interaction of the user with the type of top layer display. The historical interaction component 532 may include maintaining a log of user interactions 533 with top layer displays and a scoring component 534 for scoring the pattern of the user interaction to learn and measure the relevance of top layer displays for layer display types.

The top layer optimization component 520 may include a top layer control component 523 for making the top layer display control transparent if the top layer display does not have sufficient relevance, so that the user continues to interact with the current application in the graphical user interface.

Figure 5B:
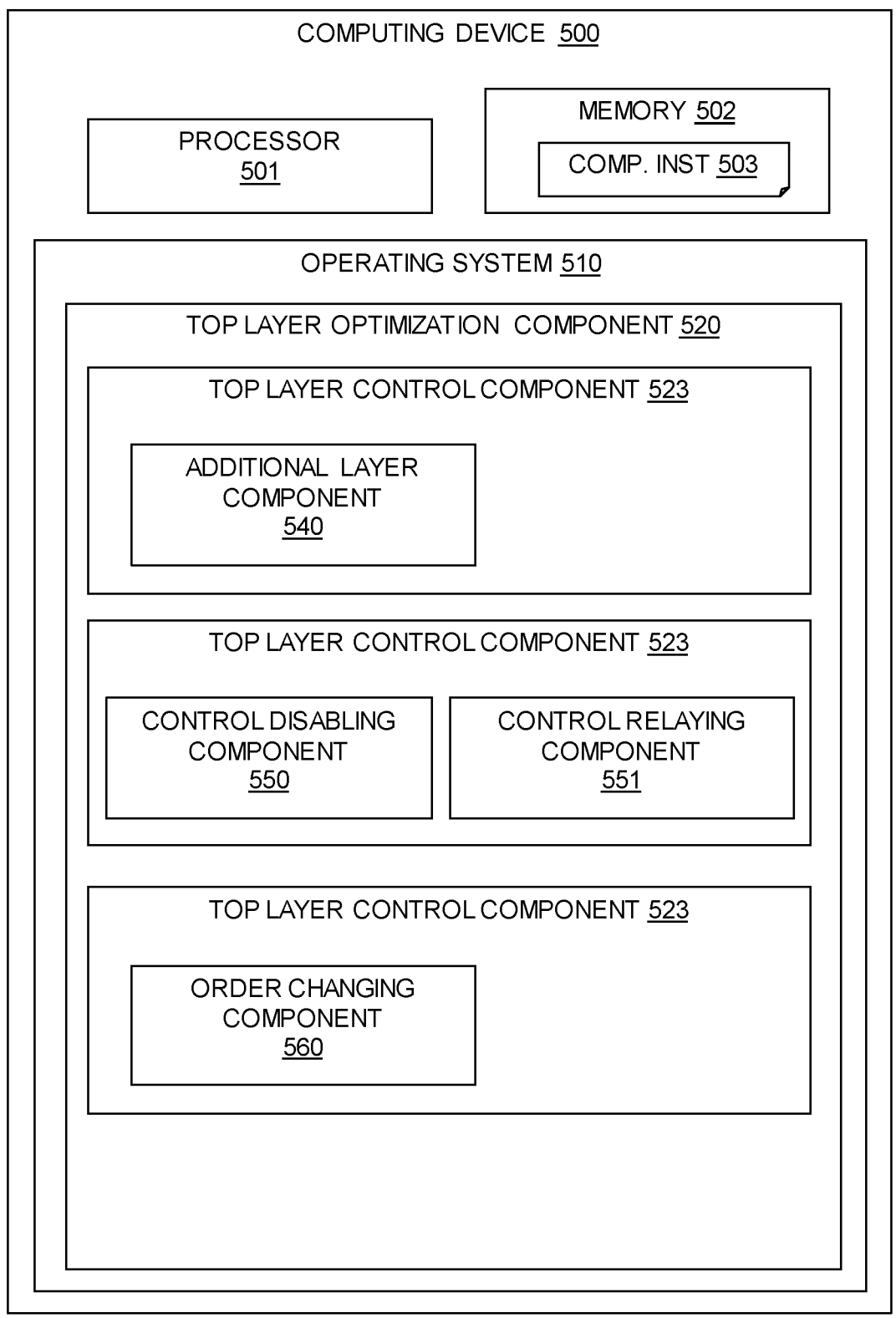

The top layer control component 523 may use various implementations. Referring to FIG. 5B, different embodiments of the top layer control component 523 are shown.

In one embodiment the top layer control component 523 may include an additional layer component 540 for providing an additional layer that is completely visually transparent on top of the top layer when control transparency of the top layer is required and the additional layer relays all user inputs to the current application layer. This embodiment is described in relation to FIG. 4A.

In another embodiment the top layer control component 523 may include a top layer control disabling component 550 for disabling any controls in the top layer and a control relaying component 551 for relaying all inputs received at the top layer to the current application layer by mapping the control input locations received by the top layer to the current application layer. This embodiment is described in relation to FIG. 4B.

In a further embodiment the top layer control component 523 may include an order changing component 560 for changing the operating system's order of the control of layers whilst maintaining the visual order of layers to transfer the order priority from the top layer to the current application layer.

Referring again to FIG. 5A, the top layer control component 523 may include an input recognition component 524 for, when the top layer display is control transparent, receiving a recognized input in the graphical user interface to activate the control of the top layer display. In a touchscreen user interface, the input may be a gesture. The top layer control component 523 may include a top layer removal component 527 for removing the top layer display when it is control transparent after a predefined time period.

The top layer optimization component 520 may include a display altering component 529 for altering the top layer display to make it partially transparent.

The top layer optimization component 520 may include a critical display component 525 for determining if the top layer display is critical, and if it is critical maintaining the user interface control with the top layer display. The critical display component 525 may include a configuring component 526 for enabling configuration of types of top layer displays as being critical.

Figure 6:
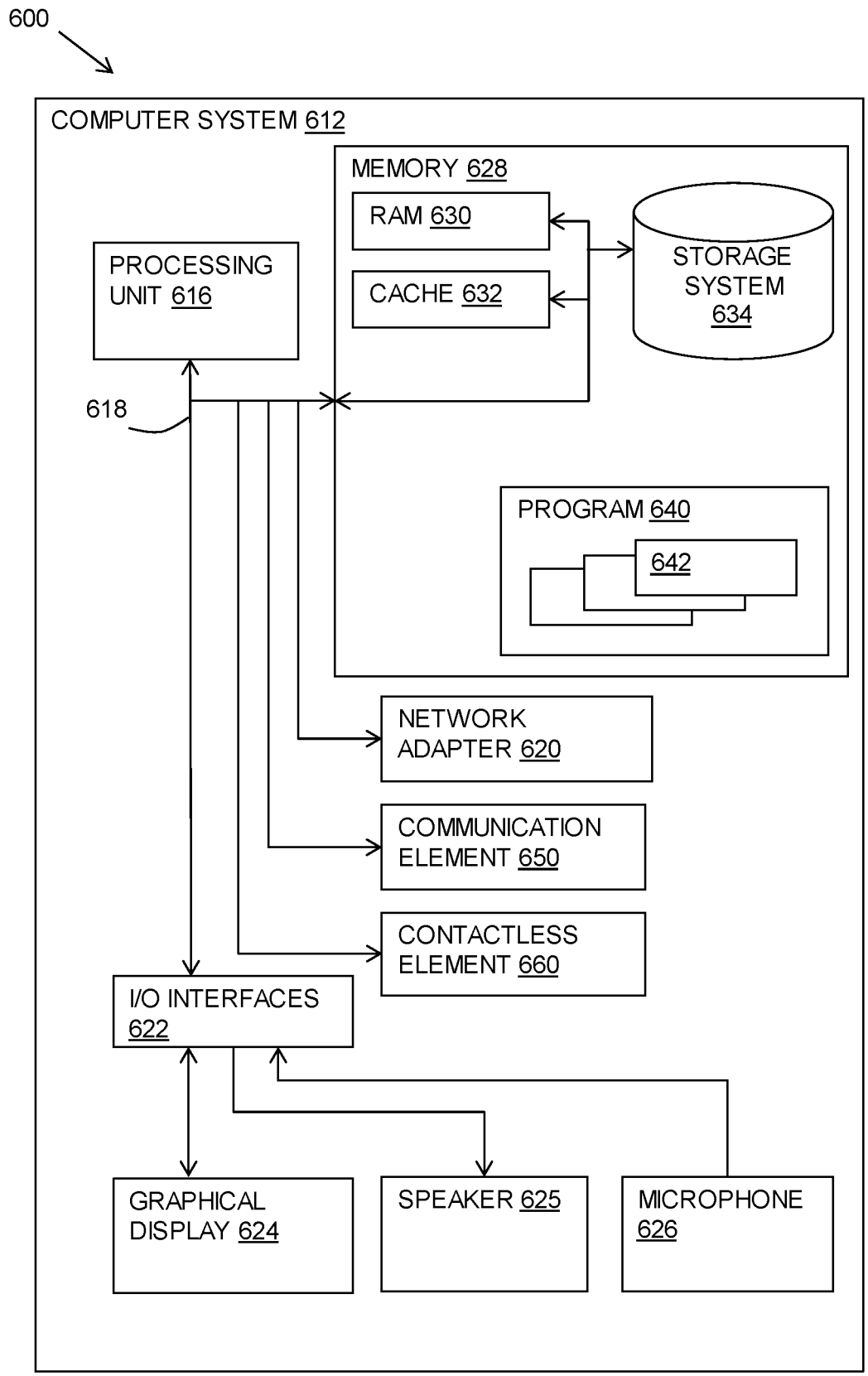
FIG. 6 is a block diagram of an example embodiment of a computing device in which the present invention may be implemented.

Referring now to FIG. 6, a schematic of an example of a system 600 which may be a form of a computer system 612 with a graphical user interface on which the described system may be implemented.

The computer system 612 may be operational with numerous other general purpose or special purpose computing system environments or configurations. Examples of well-known computing systems, environments, and/or configurations that may be suitable for use with computer system 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 612 may be described in the general context of computer system-executable instructions, such as program modules, being executed by a computer system. Generally, program modules may include routines, programs, applications, objects, components, logic, data structures, and so on that perform particular tasks or implement particular abstract data types. The computer system 612 may be used in distributed cloud computing environments where tasks are performed by remote processing devices that are linked through a communications network. In a distributed cloud computing environment, program modules may be located in both local and remote computer system storage media including memory storage devices.

In FIG. 6, a computer system 612 is shown in the form of a general-purpose computing device. The components of the computer system 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system 612 typically includes a variety of computer system readable media. Such media may be any available media that is accessible by computer system 612, and it includes both volatile and non-volatile media.

System memory 628 can include computer system readable media in the form of volatile memory, such as random access memory (RAM) 630 and/or cache memory 632. By way of example only, storage system 634 may be provided for reading from and writing to a non-removable, non-volatile magnetic media (not shown and typically called a "hard drive"). As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

The computer system 612 may include Input/Output (I/O) interfaces 622 for communicating with one or more external devices such as a keyboard, a pointing device, or a graphical display 624. The graphical display 624 may be a touchscreen user interface that enables a user to interact with the computer system 612 via a graphical display 624. The computer system 612 may also communicate with any devices (e.g., network card, modem, etc.) that enable computer system 612 to communicate with one or more other computing devices. Still yet, computer system 612 can communicate with one or more networks such as a local area network (LAN), a general wide area network (WAN), and/or a public network (e.g., the Internet) via network adapter 620. As depicted, network adapter 620 communicates with the other components of computer system 612 via bus 618.

It should be understood that although not shown, other hardware and/or software components could be used in conjunction with the computer system 612. Examples, include, but are not limited to: a camera, microphone, speakers, etc.

The computer system 612 may be a communication device, such as a mobile smart phone, and the processing unit 616 may be a microprocessor for processing the functions of the communication device and the graphical display 624 may allow a user to see the phone numbers and other information and messages. The graphical display 624 may allow a user to input information into the device, a speaker 625 may allow the user to hear voice communication, music, etc., and a microphone 626 may allow the user to transmit his or her voice through the communication device.

The communication device may also include a communication element 650 for connection to communication channels including a cellular telephone network, data transmission, etc. The communication element 650 may include an associated wireless transfer element, such as an antenna.

The communication element 650 may include a subscriber identity module (SIM) in the form of an integrated circuit that stores an international mobile subscriber identity and the related key used to identify and authenticate a subscriber using the communication device. One or more subscriber identity modules may be removable from the communication device or embedded in the communication device.

The communication device may further include a contactless element 660, which is typically implemented in the form of a semiconductor chip (or other data storage element) with an associated wireless transfer element, such as an antenna. The contactless element 660 may be associated with (e.g., embedded within) the communication device and data or control instructions transmitted via a cellular network may be applied to the contactless element 660 by means of a contactless element interface (not shown). The contactless element interface may function to permit the exchange of data and/or control instructions between mobile device circuitry (and hence the cellular network) and the contactless element 660.

The contactless element 660 may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the communication device Y00 and an interrogation device. Thus, the communication device may be capable of communicating and transferring data and/or control instructions via both a cellular network and near field communications capability.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for control of layers in a graphical user interface, comprising:
   running a current application with a current application layer of user interaction via the graphical user interface;
   detecting an event providing a top layer display of an additional application;
   determining if the top layer display is in a same area of the graphical user interface as currently being used by a user for an interaction with the current application layer, wherein when the top layer display is determined to not be in the same area, allow the top layer display to display with user interface controls, and wherein when the top layer display is determined to be in the same area, determine if the top layer display has sufficient relevance to the user to interrupt the current application;
   wherein determining if the top layer display has the sufficient relevance includes measuring relevance based on historical interaction of the user with a type of top layer display matching the top layer display, wherein the historical interaction includes a number of times the user interacted with a past top layer display having a same type as the top layer display and also includes a number of dismissals without action for the past top layer display, wherein the historical interaction includes a time to dismiss value representing an elapsed time between the past top layer display being shown to the user and the user actively dismissing the past top layer display, and wherein determining if the top layer display has sufficient relevance includes determining if the top layer display of the additional application has any actionable control elements, and if the top layer display does not have any actionable control elements, determining that the top layer display does not have sufficient relevance;
   if the top layer display does not have sufficient relevance, displaying the top layer in the same area currently being used by the user for the interaction with the current application layer by making the top layer display control transparent so that the user continues to interact with the current application in the graphical user interface while maintaining the top layer display in visual order;
   wherein control transparency is provided by providing an additional layer that is completely visually transparent on top of the top layer display when control transparency of the top layer display is required, wherein the additional layer relays all user inputs received at the additional layer to the current application layer, overriding any control elements in the top layer display; and
   wherein, when the top layer display is control transparent, providing a visual cue of control transparency to the user and receiving a recognized input in the graphical user interface to activate control of the top layer display and/or removing the top layer display after a predefined time period.

2. The computer-implemented method as claimed in claim 1, wherein, when the top layer display is control transparent, making the top layer display partially transparent to enable the user to see controls of the current application and providing the visual cue of control transparency.

3. The computer-implemented method as claimed in claim 1, wherein control transparency is further provided by:

disabling any controls in the top layer display and relaying all inputs received at the top layer display to the current application layer by mapping control input locations received by the top layer display to the current application layer.

4. The computer-implemented method as claimed in claim 1, wherein control transparency is provided by:
changing an operating system's order of control of layers whilst maintaining a visual order of layers to transfer an order priority from the top layer display to the current application layer.

5. The computer-implemented method as claimed in claim 1, including maintaining a log of user interaction with top layer displays and scoring a pattern of the user interaction to learn and measure the relevance of top layer displays for layer display types.

6. The computer-implemented method as claimed in claim 1, including determining if the top layer display is critical, and if the top layer display is critical, maintaining a user interface control with the top layer display.

7. A system for control of layers in a graphical user interface, comprising:
a processor and a memory configured to provide computer program instructions to the processor to execute a function using a plurality of components;
a current application component for running a current application with a current application layer of user interaction via the graphical user interface;
an event display detecting component for detecting an event providing a top layer display of an additional application;
a relevance component for determining if the top layer display is in a same area of the graphical user interface as currently being used by a user for an interaction with the current application layer, wherein when the top layer display is determined to not be in the same area, allow the top layer display to display with user interface controls, and wherein when the top layer display is determined to be in the same area, determine if the top layer display has sufficient relevance to the user to interrupt the current application;
wherein determining if the top layer display has the sufficient relevance includes measuring relevance based on historical interaction of the user with a type of top layer display matching the top layer display, wherein the historical interaction includes a number of times the user interacted with a past top layer display having a same type as the top layer display and also includes a number of dismissals without action for the past top layer display, wherein the historical interaction includes a time to dismiss value representing an elapsed time between the past top layer display being shown to the user and the user actively dismissing the past top layer display, and wherein determining if the top layer display has sufficient relevance includes determining if the top layer display of the additional application has any actionable control elements, and if the top layer display does not have any actionable control elements, determining that the top layer display does not have sufficient relevance; and
a top layer control component for displaying the top layer in the same area currently being used by the user for the interaction with the current application layer by making the top layer display control transparent if the top layer display does not have sufficient relevance, so that the user continues to interact with the current application in the graphical user interface while maintaining the top layer display in visual order;
wherein control transparency is provided by providing an additional layer that is completely visually transparent on top of the top layer display when control transparency of the top layer display is required, wherein the additional layer relays all user inputs received at the additional layer to the current application layer, overriding any control elements in the top layer display; and
wherein, when the top layer display is control transparent, providing a visual cue of control transparency to the user and receiving a recognized input in the graphical user interface to activate control of the top layer display and/or removing the top layer display after a predefined time period.

8. The system as claimed in claim 7, including a display altering component for, when the top layer display is control transparent, making the top layer display partially transparent to enable the user to see controls of the current application and providing the visual cue of control transparency.

9. The system as claimed in claim 7, wherein the top layer control component includes:
a top layer control disabling component for disabling any controls in the top layer display and a control relaying component for relaying all inputs received at the top layer display to the current application layer by mapping control input locations received by the top layer display to the current application layer.

10. The system as claimed in claim 7, wherein the top layer control component includes:
an order changing component for changing an operating system's order of the control of layers whilst maintaining a visual order of layers to transfer an order priority from the top layer display to the current application layer.

11. A computer program product for control of layers in a graphical user interface, the computer program product comprising a computer readable storage medium having program instructions embodied therewith, the program instructions executable by a processor to cause the processor to:
run a current application with a current application layer of user interaction via the graphical user interface;
detect an event providing a top layer display of an additional application;
determining if the top layer display is in a same area of the graphical user interface as currently being used by a user for an interaction with the current application layer, wherein when the top layer display is determined to not be in the same area, allow the top layer display to display with user interface controls, and wherein when the top layer display is determined to be in the same area, determine if the top layer display has sufficient relevance to the user to interrupt the current application;
wherein determining if the top layer display has the sufficient relevance includes measuring relevance based on historical interaction of the user with a type of top layer display matching the top layer display, wherein the historical interaction includes a number of times the user interacted with a past top layer display having a same type as the top layer display and also includes a number of dismissals without action for the past top layer display, wherein the historical interaction includes a time to dismiss value representing an elapsed time between the past top layer display being shown to the user and the user actively dismissing the past top layer display, and wherein determining if the top layer display has sufficient relevance includes determining if the top layer display of the additional application has any actionable control elements, and if the top layer display does not have any actionable control elements, determining that the top layer display does not have sufficient relevance; and if the top layer display does not have sufficient relevance, displaying the top layer in the same area currently being used by the user for the interaction with the current application layer by making the top layer display control transparent so that the user continues to interact with the current application in the graphical user interface while maintaining the top layer display in visual order;

wherein control transparency is provided by providing an additional layer that is completely visually transparent on top of the top layer display when control transparency of the top layer display is required, wherein the additional layer relays all user inputs received at the additional layer to the current application layer, overriding any control elements in the top layer display; and wherein, when the top layer display is control transparent, provide a visual cue of control transparency to the user and receive a recognized input in the graphical user interface to activate control of the top layer display and/or removing the top layer display after a predefined time period.

* * * * *